United States Patent
Moles et al.

(10) Patent No.: US 6,505,048 B1
(45) Date of Patent: Jan. 7, 2003

(54) LOCATION PRIVACY FEATURE FOR WIRELESS MOBILE STATIONS AND METHOD OF OPERATION

(75) Inventors: Bryan J. Moles, Dallas, TX (US); Sudhindra P. Herle, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/477,796

(22) Filed: Dec. 30, 1999

(51) Int. Cl.⁷ ............................................. H04Q 7/20
(52) U.S. Cl. .................. 455/456; 455/421; 455/432; 455/414
(58) Field of Search ............................. 455/421, 432, 455/435, 456, 457, 414

(56) References Cited

U.S. PATENT DOCUMENTS

| | | | | |
|---|---|---|---|---|
| 6,009,091 A | * | 12/1999 | Stewart | 370/342 |
| 6,049,718 A | * | 4/2000 | Stewart | 455/456 |
| 6,138,003 A | * | 10/2000 | Kingdon | 455/410 |
| 6,226,589 B1 | * | 5/2001 | Maeda | 701/207 |
| 6,311,069 B1 | * | 10/2001 | Havinis | 455/456 |
| 6,360,102 B1 | * | 3/2002 | Havinis et al. | 382/173 |
| 6,366,781 B1 | * | 4/2002 | Hussain et al. | 455/414 |

* cited by examiner

Primary Examiner—Edward F. Urban
Assistant Examiner—Khawar Iqbal (57) ABSTRACT

In a wireless mobile station of the type having a position locating system capable of determining the location of the wireless mobile station, there is disclosed control circuitry capable of being selectively set to disable the transmission of information concerning the location of the wireless mobile station. The control circuitry also comprises a directory of telephone numbers of locations authorized to receive information concerning the location of the wireless mobile station. Also disclosed is control circuitry capable of receiving a code that causes the wireless mobile station to transmit information concerning the location of the wireless mobile station. Also disclosed are methods for selectively disabling the transmission of information concerning the location of the wireless mobile station.

20 Claims, 3 Drawing Sheets

LOCATION PRIVACY FEATURE FOR WIRELESS MOBILE STATIONS AND METHOD OF OPERATION

TECHNICAL FIELD OF THE INVENTION

The present invention is directed, in general, to wireless communication systems and, more specifically, to a system and method for selectively disabling the transmission of information concerning the location of a wireless mobile station.

BACKGROUND OF THE INVENTION

Reliable predictions indicate that there will be over three hundred million (300,000,000) cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a party using a subscriber handset (a wireless mobile station) and another party using the same type of subscriber handset. The voice conversations take place through the wireless network. A smaller number of wireless mobile stations are data devices, such as personal computers (PCs) equipped with cellular/wireless modems. Because the bandwidth for a current generation wireless mobile station is typically limited to a few tens of kilobits per second (Kbps), the applications for the current generation of wireless mobile stations are relatively limited.

However, this is expected to change in the next (or third) generation of cellular/wireless technology, sometimes referred to as "3G" cellular/wireless, where a much greater bandwidth will be available to each wireless mobile station (e.g., 125 Kbps or greater). The higher data rates will make Internet applications for wireless mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

The availability of greater bandwidth is making new features available for wireless mobile stations. One of the new features that has begun to appear in wireless mobile stations is the global positioning system (GPS) unit. GPS is a well known satellite based system for determining the geographic location of a transmitter in terms of latitude and longitude. A GPS unit in a wireless mobile station is capable of receiving signals from several GPS satellites and determining the location of the wireless mobile station to within a few meters.

Information from a GPS unit concerning the location of a wireless mobile station in terms of latitude and longitude may be displayed on the display unit of the wireless mobile station. Location information from the GPS unit may be very useful to the user of the wireless mobile station. For example, if the user of the wireless mobile station were to get lost in a wilderness area, the GPS unit in the wireless mobile station could give the user his exact location. If the user were to witness an automobile crash or other similar accident in a rural area where there are no street names, the user could call for assistance and give the exact location of the accident. If the user were to be involved in an accident or emergency, the user could call an emergency number such as 911 and the GPS unit in the wireless mobile station would give the exact location of the mobile station.

The location of a wireless mobile station may also be of interest to the operator of the wireless network. If the operator of the wireless network wishes to check the signal strength that the wireless mobile stations are receiving from the base station transmitters, it would be advantageous to the operator to know the exact distance of each of the wireless mobile stations to the nearest base station transmitter. To obtain this information the operator could send a signal to each individual wireless mobile station to ask each GPS unit to transmit to the operator the exact location of the wireless mobile station in which the GPS unit is located.

A GPS unit is a specific example of a position locating system that is capable of locating a wireless mobile station. Other types of position locating systems exist that are also capable of locating a wireless mobile station.

Many users of wireless mobile stations will not want their location to be available to the operator of the wireless network (or to any other party). Many users believe that the exact location of their wireless mobile station as determined by a position locating system is private information and is not to be divulged to any party without the user's consent. As the number of wireless mobile stations with a position locating system increases over time, there will very likely be an increase in the number of users who desire to control the disclosure of the location of their wireless mobile station.

Therefore, in a wireless mobile station of the type having a position locating system that is capable of determining the location of the wireless mobile station, there is a need for an apparatus and method for selectively disabling the transmission of information concerning the location of the wireless mobile station. Because there will be instances when the user of the wireless mobile station will want the location of the wireless mobile station to be transmitted, there is also a need for a user to have the ability to selectively transmit the location of the wireless mobile station to authorized parties. This is especially true in cases where an emergency exists and the user wants his or her location known immediately.

In situations where the wireless mobile station has been lost or stolen, there is a need for the user to have a code stored in the wireless mobile station that can be used to cause the wireless mobile station to transmit its location to the nearest base station. In such cases the user would contact the base station operator and give the user's code to the base station operator. Then the base station operator would transmit the code to override the location privacy feature and locate the wireless mobile station. After the user had recovered the lost or stolen wireless mobile station, then the user would change the code and maintain the privacy of the location of the wireless mobile station as before.

SUMMARY OF THE INVENTION

To address the needs described above, it is a primary object of the present invention to provide, for use in a wireless mobile station of the type having a position locating system that is capable of determining the location of the wireless mobile station, an apparatus and method for selectively disabling the transmission of information concerning the location of the wireless mobile station.

It is an additional object of the present invention to provide control circuitry in a wireless mobile station comprising a controller and a memory unit having a location privacy flag in which a value set in the location privacy flag determines whether information concerning the location of the wireless mobile station is to be transmitted.

It is another object of the present invention to provide a directory of authorized telephone numbers in a wireless mobile station that are authorized to receive information concerning the location of the wireless mobile station.

It is still another object of the present invention to provide a directory of emergency telephone numbers in a wireless mobile station that are always automatically authorized to receive information concerning the location of the wireless mobile station.

It is yet another object of the present invention to provide control circuitry in a wireless mobile station capable of causing the wireless mobile station to transmit either a null code or a null message that indicates that information concerning the location of the wireless mobile station is not being transmitted.

It is also an object of the present invention to provide control circuitry in a wireless mobile station capable of receiving a code that causes the wireless mobile station to transmit information concerning the location of the wireless mobile station.

It is an additional object of the present invention to provide control circuitry in a wireless mobile station for determining that a code transmitted to and received by the wireless mobile station is the code that authorizes the transmission of information concerning the location of the wireless mobile station.

It is yet another object of the present invention to provide control circuitry for recording the date and time when the location privacy feature of the present invention has been enabled and disabled.

It is also another object of the present invention to provide control circuitry for selectively transmitting a substitute location of a wireless mobile station instead of transmitting the actual location of the wireless mobile station.

It is another object of the present invention to provide for use in a wireless mobile station of the type having a position locating system capable of locating the wireless mobile station, a method for selectively disabling the transmission of information concerning the location of the wireless mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
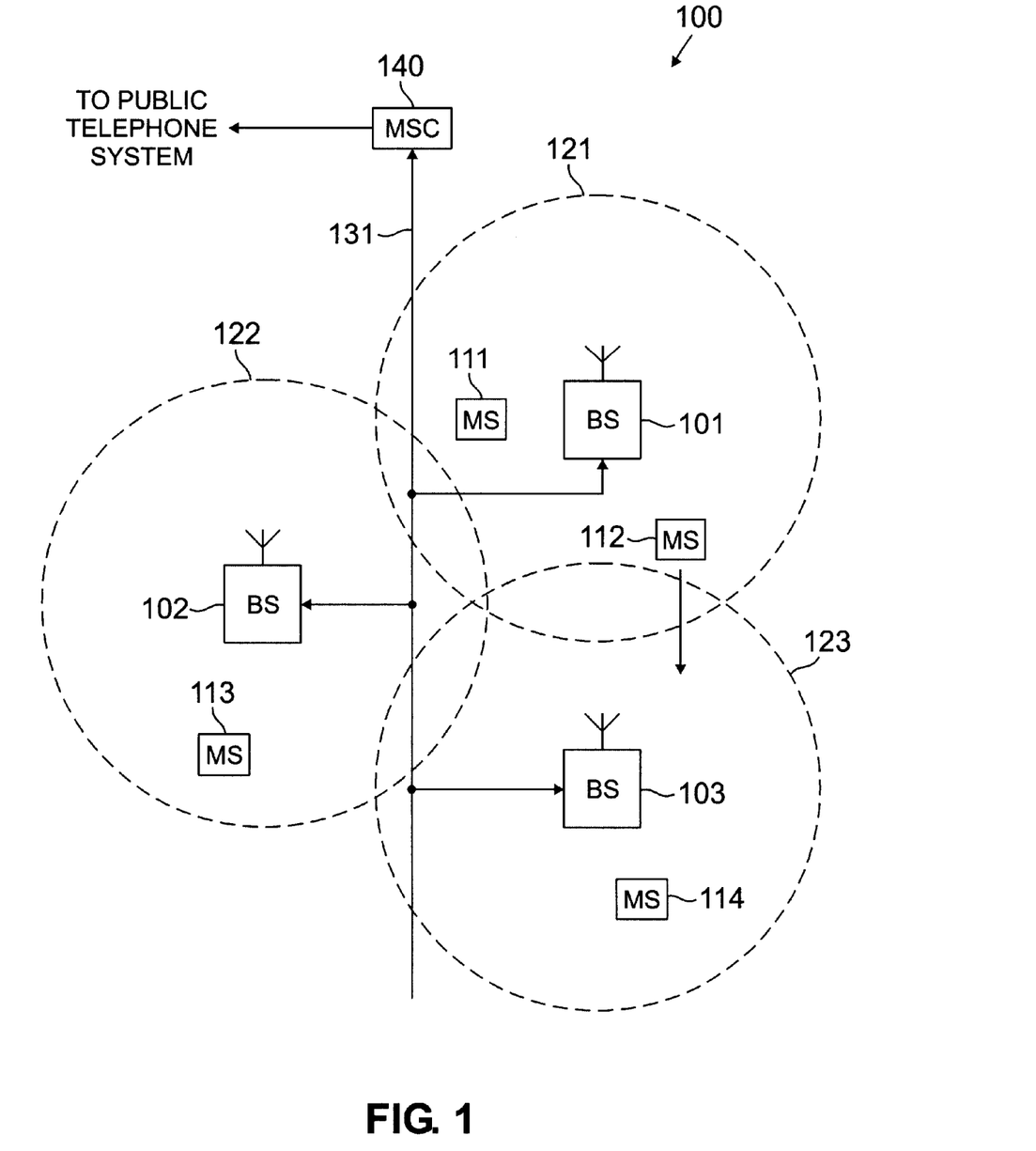
FIG. 1 illustrates a general overview of an exemplary wireless network according to one embodiment of the present invention.
Figure 2:
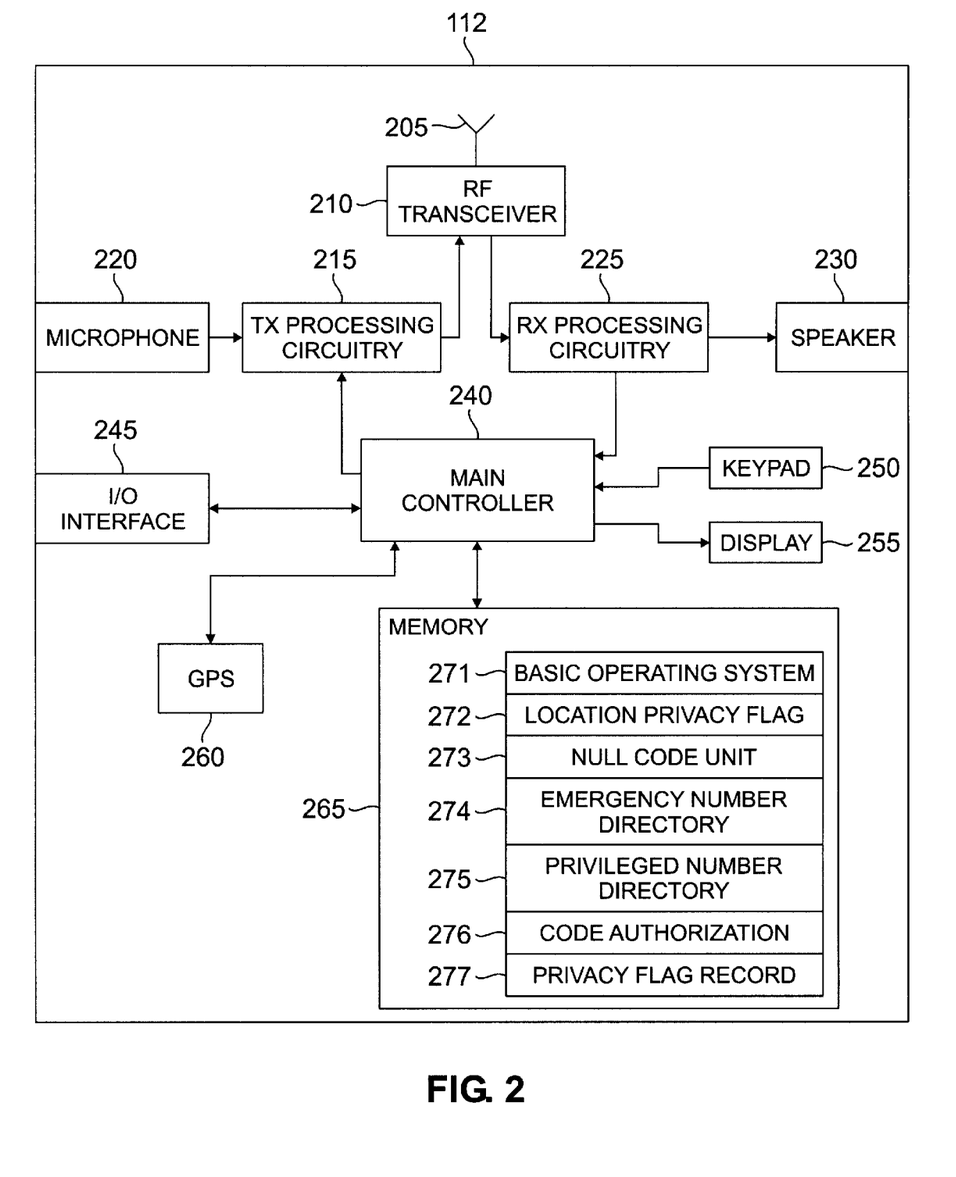
FIG. 2 illustrates a block diagram of the circuitry of a wireless mobile station comprising the apparatus of one embodiment of the present invention.
Figure 3:
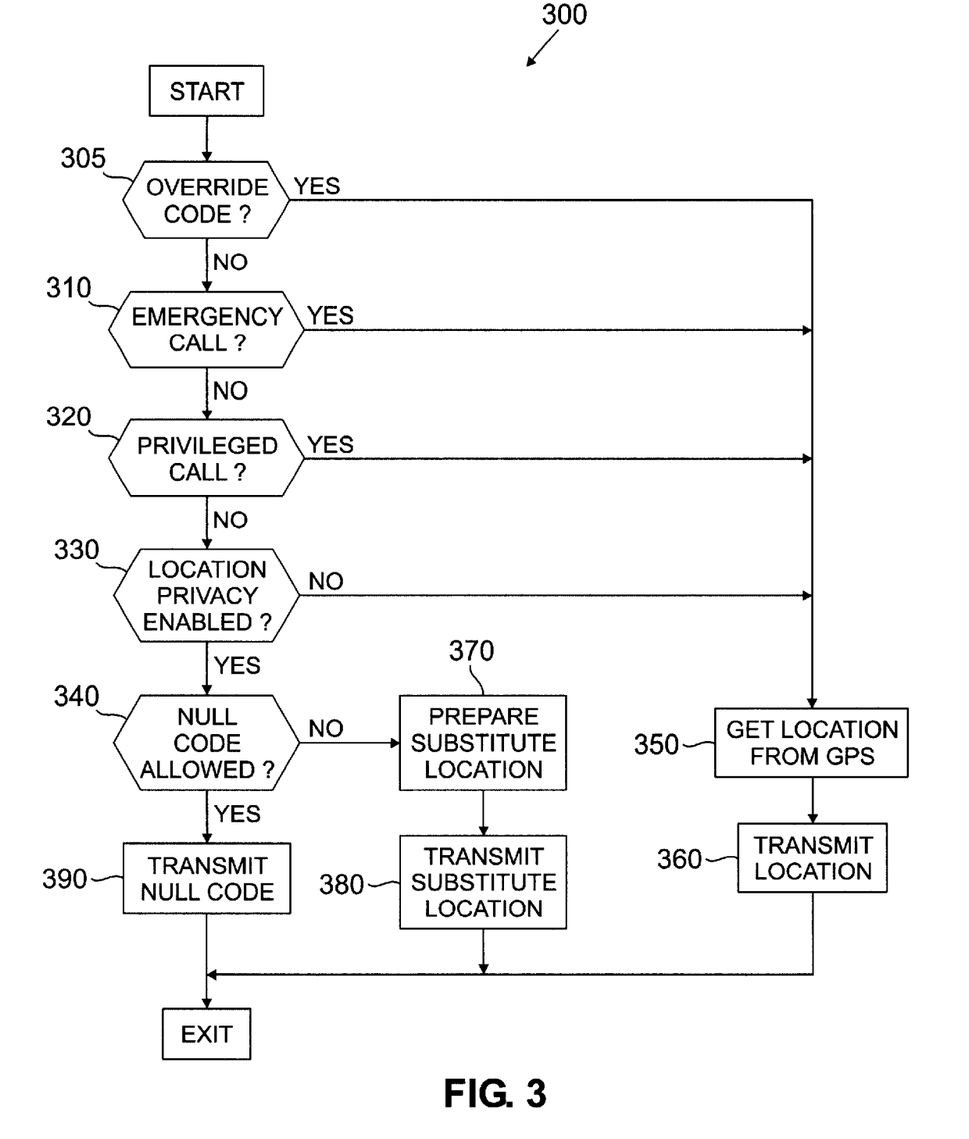
FIG. 3 is a flow diagram illustrating the logic of the operation of the apparatus of one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of wireless mobile stations (MS) 111–114. Wireless mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a base station that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a wireless mobile station that is communicating in the control or paging channel, rather than transmitting voice and/or data signals in the regular traffic channels. In the description that follows wireless mobile station MS 112 will be in communication with wireless network base station BS 103.

FIG. 2 sets forth a block diagram illustrating the circuitry of wireless mobile station 112 where the MS designation has been dropped for convenience. Wireless mobile station 112 comprises radio frequency (RF) transceiver 210 coupled to antenna 205 for receiving a forward channel signal from wireless network base station BS 103 and for sending a reverse channel signal to wireless network base station BS 103 in accordance with well known principles.

RF transceiver 210 is coupled to receiving processing circuitry 225 which, in turn, is coupled to speaker 230 and main controller 240. Main controller 240 is coupled to transmission processing circuitry 215 which, in turn, is coupled to microphone 220 and RF transceiver 210. Main controller 240 controls the reception of forward channel signals and the transmission of reverse channel signals in accordance with well known principles. Main controller 240 is also coupled to I/O interface 245, keypad 250 and display unit 255. Main controller 240 controls the transmission of signals to and from these elements with methods well known in the art.

Global positioning system (GPS) 260 is coupled to main controller 240. Global positioning system 260 is a well known system for determining the geographic location of mobile station 112 in terms of latitude and longitude. When tasked to do so by main controller 240, global positioning system 260 receives GPS signals from two or more GPS satellites via RF transceiver 210 and receiver processing circuitry 225. Global positioning system 260 uses the received GPS signals to determine latitude and longitude using well known techniques. The latitude and longitude of wireless mobile station 112 may then be displayed on display unit 255 for the user.

The user of wireless mobile station 112 may initiate a request for location information at any time by accessing a location request menu (not shown) on display unit 255 and by typing the request on keypad 250.

Global positioning system 260 is a specific example of a position locating system that is capable of locating a wireless mobile station. Other types of position locating systems exist that are also capable of locating a wireless mobile station. For example, the IS-801 communication standard (formerly known as the PN4535 communication standard) is capable of defining messages for a wireless mobile station and a wireless network to request information from each other so that the wireless network can determine the location of the wireless mobile station.

An advantageous embodiment of the present invention will be shown and described in which the position locating system is a global positioning system. It is understood, however, that the present invention is not limited to use in a wireless mobile station having a global positioning system. The present invention may be used in a wireless mobile station having any type of position locating system that (1) requires the wireless mobile station to determine its position, or (2) requires the wireless mobile station to send at least some information to the wireless network in order for the wireless network to be able to determine the position of the wireless mobile station.

In order to control the transmission of information concerning the location of wireless mobile station 112, wireless mobile station 112 comprises memory unit 265 coupled to main controller 240. As shown in FIG. 2, an advantageous embodiment of memory unit 265 comprises seven subunits. The first subunit is basic operating system 271. Basic operating system 271 comprises those portions of memory unit 265 that are accessed by main controller 240 during ordinary operations of wireless mobile station 112.

The second subunit of memory unit 265 is location privacy flag 272. Location privacy flag 272 may be selectively set to cause wireless mobile station 112 to not transmit information concerning the location of wireless mobile station 112. The user can selectively set the value of location privacy flag 272 by entering data through keypad 250 in response to a menu displayed on display unit 255. For example, a user can type the letters "no" on keypad 250 in response to a question on a transmission status menu (not shown) on display unit 255 asking whether location information is to be transmitted. Later, if the user desires to allow the transmission of location information, the user can access the transmission status menu and type the letters "yes" in response to the same question on the transmission status menu. When the user makes such changes, main controller 240 updates the status of location privacy flag 272 in memory unit 265.

Whenever main controller 240 is preparing a communication for transmission through transmission processing circuitry 215 and RF transceiver 210 and antenna 205, main controller 240 first tests the status of location privacy flag 272. If the value of location privacy flag 272 indicates that location information is to be transmitted, then the communication will be transmitted with the latitude and longitude information from global positioning system 260 concerning the location of wireless mobile station 112.

If the value of location privacy flag 272 indicates that location information is not to be transmitted, then the communication will be transmitted without any information concerning the location of wireless mobile station 112.

The third subunit of memory unit 265 is null code unit 273. Null code unit 273 contains a code that indicates that wireless mobile station 112 is not transmitting information concerning the location of wireless mobile station 112. The code in null code unit 273 will usually be a binary number such as "000111" or some other similar number. In cases in which main controller 240 is to send a transmission without sending any information concerning the location of wireless mobile station 112, main controller 240 accesses the code in null code unit 273 of memory 265 and transmits the code in null code unit 273.

In an alternative embodiment of the present invention, null code unit 273 contains a string of characters that indicates that wireless mobile station 112 is not transmitting information concerning the location of wireless mobile station 112. For example, the string of characters contained within null code unit 273 could be the letters "null" or the letters "location not sent" or other letters spelling out a similar message. In this alternative embodiment of the present invention, the user can change the characters within null code unit 273 by typing new characters on keypad 250 in response to a question on a transmission status menu (not shown) on display unit 255.

There may be cases in which a base station will be programmed to not accept a null code (or other message) indicating that location information will not be transmitted. For example, base station BS 103 may be programmed so that any failure of wireless mobile station 112 to send the requested location information may cause base station BS 103 to drop wireless mobile station 112 from wireless network 100.

To avoid this result in such cases, an advantageous embodiment of the present invention prepares and sends substitute location information. Substitute location information is prepared by obtaining the actual location information from global positioning system 260 and altering the information before it is transmitted. The substitute location information is prepared by main controller 240. Because the substitute location information is sent when the null code will not be accepted by a base station, the substitute location information may be stored in null code unit 273.

A base station that is programmed to not accept a null code (or other message) will be expecting to receive location information that gives the latitude and longitude of a position within the base station's cell site. Therefore, substitute location information for wireless mobile station 112 will preferably locate wireless mobile station 112 within its current cell site. This may be accomplished by altering the values of the longitude and latitude by relatively small amounts.

Because global positioning system 260 is accurate to within a few meters, the amount of alteration required to alter the actual location information may be as little as one hundred yards (100 yds) and still provide adequate location privacy for the user. The amount of alteration required to alter the actual location information can range from as little as one hundred yards (100 yds) up to ten miles (10 mi) depending on the size of the cell site involved. The amount of alteration in each case can be selected as necessary. Main controller 240 may be programmed to make the proper amount of alteration in each case.

In an advantageous embodiment of the present invention, the user can select the amount of alteration required to alter the actual location information to create the substitute location information to be transmitted. The user can type letters or numbers (or a combination of both letters and numbers) on keypad 250 in response to a question on a substitute location menu (not shown) on display unit 255 asking for the amount of the alteration. For example, the user could type "100 yards north" and this entry would cause the substitute location to be reported as one hundred yards (100 yds) north of the actual location.

Later, if the user desires to change the amount of alteration required to the actual location information to create the substitute location information, the user can access the substitution location menu and type in a new value for the amount of alteration. When the user makes such changes, main controller 240 updates the current value of the amount of alteration in null code unit 273 in memory unit 265.

The fourth subunit of memory unit 265 is emergency number directory 274. The telephone numbers in emergency number directory 274 are the telephone numbers of locations that provide emergency services such as emergency medical services, police services, fire department services, and similar services. The most well known emergency number in many locations in the United States is 911. The user of wireless mobile system 112 can add his or her own emergency numbers to the emergency number directory 274. Each emergency telephone number in emergency number directory 274 is always authorized to receive information concerning the location of wireless mobile station 112. That is, any call or communication to one of the emergency telephone numbers will always cause main controller 240 to transmit information concerning the location of wireless mobile station 112.

The fifth subunit of memory unit 265 is privileged number directory 275. The telephone numbers in privileged number directory 275 are telephone numbers that the user has previously determined are authorized to receive information concerning the location of wireless mobile station 112. In addition to referring to conventional telephone numbers for voice calls, the term "telephone number" (as used to describe the contents of privileged number directory 275) also refers to alphanumeric "telephone numbers" for data calls such as IP addresses, e-mail addresses, Web site addresses, URLs, and the like. The user of wireless mobile system 112 can add telephone numbers to (or delete telephone numbers from) the privileged number directory 275 at any time. Thus, a call to one of the privileged telephone numbers will cause main controller 240 to transmit location information if needed. Retention of a privileged telephone number in privileged telephone number directory 275 is always at the user's discretion.

The sixth subunit of memory unit 265 is code authorization unit 276. Code authorization unit 276 is capable of overriding the location privacy feature of the present invention in situations where mobile wireless station 112 has been lost or stolen. In such situations there is a need for the user to have a code stored in wireless mobile station 112 that is capable of causing wireless mobile station 112 to transmit its location to the nearest base station. The code causes such a transmission to be made even if the value of location privacy flag 272 indicates that the location of wireless mobile station 112 is not to be transmitted.

In an advantageous embodiment of the present invention, the user can place a user selected code in code authorization unit 276. The user types letters or numbers (or a combination of both letters and numbers) on keypad 250 in response to a question on a code entry menu (not shown) on display unit 255 that requests the code. Later, if the user desires to change the code in code authorization unit 276, the user can access the code entry menu and type in a new code in response to the same question on the menu. When the user makes such changes, main controller 240 updates the current code in code authorization unit 276 in memory unit 265.

If the wireless mobile station 112 becomes lost or stolen, the user may contact the base station operator and give the user's code to the base station operator. Then the base station operator transmits the code to override the location privacy feature. When main controller 240 receives the transmitted code main controller 240 compares the transmitted code with the code stored in code authorization unit 276 of memory unit 265. If the transmitted code matches the stored code, then main controller 240 causes global positioning system 260 to determine the location of wireless mobile station 112. Main controller 240 may then transmit the location of wireless mobile station 112. In this manner the location of wireless mobile station 112 can be determined by the base station operator and the user.

In addition to the base station's direct transmission of the code, the code can be sent to wireless mobile station 112 through a communication, including, without limitation, a voice call, a data call, an e-mail, a Short Messaging Service (SMS) message, a wireless LAN connection, and the like.

In an alternate embodiment of the present invention, a special "noisy" code may be utilized in cases where the wireless mobile station has been lost or stolen. A "noisy" code is a code that causes the wireless mobile station to become inoperable, make loud noises, vibrate constantly, flash the liquid crystal display, or take similar annoying actions. Using a "noisy" code to cause such actions will draw attention to a lost wireless mobile station. Using a "noisy" code to cause such actions will also draw attention to a person in possession of a stolen wireless mobile station.

The seventh subunit of memory unit 265 is privacy flag record 277. Privacy flag record 277 records the time and date of each occurrence of location privacy flag 272 being enabled or disabled. The information stored in privacy flag record 277 is available to main controller 240. The user can access the information in privacy flag record 277 by typing a command on keypad 250 to display the information in privacy flag record 277 on display unit 255. Alternatively, the user can type a command on keypad 250 to send the information in privacy flag record 277 to another output device (not shown) through I/O interface 245.

FIG. 3 is a flow diagram 300 describing the logic of the operation of the apparatus of an advantageous embodiment of the present invention. In decision step 305 main controller 240 determines whether a valid override code has been received. Main controller 240 compares a transmitted code with the code stored in code authorization unit 276 of memory unit 265. If the transmitted code matches the stored code, then a valid override code has been received and main controller 240 executes operation step 350 to cause global positioning system 260 to determine the location of wireless mobile station 112. Operation step 360 then causes wireless mobile station 112 to transmit the location information.

A valid override code must be received with each override request for location information. That is, after an override request with a valid override code has been received and the location information has been transmitted, the next override request must also have a valid override code or the location information will not be transmitted.

If a valid override code has not been received, then decision operation 310 determines whether the call being made is an emergency call. Main controller 240 compares the telephone number being called with the telephone numbers in emergency number directory 274 of memory unit 265. If the telephone number being called matches one of the emergency telephone numbers, then main controller 240 executes operation step 350 to cause global positioning system 260 to determine the location of wireless mobile station 112. Operation step 360 then causes wireless mobile station 112 to transmit the location information.

If an emergency telephone number is not being called, then decision operation 320 determines whether the call being made is a privileged call. Main controller 240 compares the telephone number being called with the telephone numbers in privileged number directory 275 of memory unit 265. As before, the term "telephone number" refers both to conventional telephone numbers for voice calls and to alphanumeric telephone numbers for data calls. If the telephone number being called matches one of the privileged telephone numbers, then main controller 240 executes operation step 350 to cause global positioning system 260 to determine the location of wireless mobile station 112. Operation step 360 then causes wireless mobile station 112 to transmit the location information.

If a privileged telephone number is not being called, then decision operation 330 determines whether the location privacy feature has been enabled. Main controller 240 tests the value of location privacy flag 272 in memory unit 265 to determine whether information concerning the location of wireless mobile station 112 is to be transmitted or is not to be transmitted. If the location information is to be transmitted, then main controller 240 executes operation step 350 to cause global positioning system 260 to determine the location of wireless mobile station 112. Operation step 360 then causes wireless mobile station 112 to transmit the location information.

If the location privacy feature is enabled and the location information is not to be transmitted, then decision operation 340 determines whether the base station will accept a null code (or a "null message" stating that the location information is not being transmitted). If the null code (or null message) will be accepted by the base station, then operation step 390 transmits the null code (or null message) to the base station.

If the null code (or null message) will not be accepted by the base station, then main controller 240 executes operation step 370 to prepare a substitute location for transmission by wireless mobile station 112. Operation step 380 then causes wireless mobile station 112 to transmit the substitute location.

The location privacy feature of the present invention also functions when wireless mobile station 112 is in an idle state. An idle state occurs when wireless mobile station 112 is turned on (i.e., powered up) but is not sending or receiving user traffic. During the idle state the wireless mobile station 112 is in communication with base station 103 to handle routine functions such as making an "idle" handoff between cell sites as previously described. If the user has previously enabled the location privacy feature by setting location privacy flag 272, location privacy flag 272 remains set and disables the transmission of location information even during times when wireless mobile station 112 is in an idle mode.

There may be instances where the user wishes to enable the location privacy feature for voice calls and not for data calls. The reverse may also be true. There may be instances where the user wishes to enable the location privacy feature for data calls and not for voice calls. Either of these modes of operation may be accomplished by setting and testing separate additional location privacy status flags for data and for voice calls in memory unit 265 in the same manner as that described for location privacy flag 272.

There may also be instances where the user wishes to enable the location privacy feature for one or more particular types of calls (e.g., e-mail). Such a mode of operation may be accomplished by setting and testing one or more separate additional location privacy status flags (one for each particular type of call) in memory unit 265 in the same manner as that described for location privacy flag 272.

Although the present invention has been described in detail, those skilled in the art should understand that they can make various changes, substitutions and alterations herein without departing from the spirit and scope of the invention in its broadest form.

What is claimed is:

1. For use in a wireless mobile station of the type having a position locating system capable of locating said wireless mobile station, control circuitry capable of (i) selectively disabling the transmission of information concerning the location of said wireless mobile station and (ii) transmitting a substitute location instead of the actual location of said wireless mobile station.

2. The control circuitry as set forth in claim 1 wherein said control circuitry comprises a controller and a memory unit coupled to said controller, said memory unit comprising a location privacy flag that may be selectively set to cause said wireless mobile station to disable the transmission of information concerning the location of said wireless mobile station.

3. The control circuitry as set forth in claim 2 wherein said memory unit further comprises an emergency number directory that contains emergency telephone numbers of locations that are authorized to receive the location of said wireless mobile station.

4. The control circuitry as set forth in claim 2 wherein said memory unit further comprises a privileged number directory that contains telephone numbers of locations that are authorized to receive the location of said wireless mobile station.

5. The control circuitry as set forth in claim 1 wherein said control circuitry is capable of receiving a code that causes said wireless mobile station to transmit information concerning the location of said wireless mobile station.

6. The control circuitry as set forth in claim 1 wherein said control circuitry is capable of transmitting a null code when the transmission of information concerning the location of said wireless mobile station is disabled.

7. The control circuitry as set forth in claim 1 wherein said control circuitry is capable of transmitting a null message when the transmission of information concerning the location of said wireless mobile station is disabled.

8. The control circuitry as set forth in claim 1 wherein said control circuitry is capable of receiving an override code directing said control circuitry to enable the transmission of information concerning the location of said wireless mobile station when the transmission of information concerning the location of said wireless mobile station is disabled.

9. A wireless mobile station comprising:
   a transceiver capable of receiving a forward channel signal from a wireless network base station and capable of transmitting a reverse channel signal to said wireless network base station;
   a position locating system capable of determining the location of said wireless mobile station; and
   control circuitry capable of (i) selectively disabling the transmission of information concerning the location of said wireless mobile station and (ii) transmitting a substitute location instead of the actual location of said wireless mobile station to said base station.

10. A wireless mobile station as set forth in claim 9 wherein said control circuitry comprises a controller and a memory unit coupled to said controller, said memory unit comprising a location privacy flag that may be selectively set to cause said wireless mobile station to disable the transmission of information concerning the location of said wireless mobile station.

11. A wireless mobile station as set forth in claim 10 wherein said control circuitry further comprises an emergency number directory that contains emergency telephone numbers of locations that are authorized to receive the location of said wireless mobile station.

12. A wireless mobile station as set forth in claim 10 wherein said control circuitry further comprises a privileged number directory that contains telephone numbers of locations that are authorized to receive the location of said wireless mobile station.

13. A wireless mobile station as set forth in claim 9 wherein said control circuitry is capable of receiving a code that causes said wireless mobile station to transmit information concerning the location of said wireless mobile station.

14. A wireless mobile station as set forth in claim 9 wherein said control circuitry is capable of receiving an override code directing said control circuitry to enable the transmission of information concerning the location of said wireless mobile station when the transmission of information concerning the location of said wireless mobile station is disabled.

15. For use in a wireless mobile station of the type having a position locating system capable of locating said wireless mobile station, a method of selectively disabling the transmission of information concerning the location of said wireless mobile station comprising the steps of:
   setting a location privacy flag in said wireless mobile station to indicate whether information concerning the location of said wireless mobile station is not to be transmitted;
   testing the value of said location privacy flag to determine whether information concerning the location of said wireless mobile station is not to be transmitted;
   disabling the transmission of information concerning the location of said wireless mobile station if the value of said location privacy flag indicates that information concerning the location of said wireless mobile station is not to be transmitted; and
   transmitting a substitute location instead oft he actual location of said wireless mobile station.

16. A method as set forth in claim 15 together with the step of:

storing a user selected code in said wireless mobile station that causes said wireless mobile station to transmit information concerning the location of said wireless mobile station when said user selected code is transmitted to said wireless mobile station.

17. A method as set forth in claim 16 together with the steps of:

transmitting a code to said wireless mobile station;

testing said code to determine whether said code is the same as said user selected code stored in said wireless mobile station; and transmitting information concerning the location of said wireless mobile station if said code is the same as said user selected code.

18. A method as set forth in claim 15 together with the steps of:

testing whether a telephone number that said wireless mobile station is calling is listed in an emergency number directory in said wireless mobile station; and transmitting information concerning the location of said wireless mobile station to the location of said telephone number if said telephone number is in said emergency number directory even if the value of said location privacy flag indicates that information concerning the location of said wireless mobile station is not to be transmitted.

19. A method as set forth in claim 15 together with the steps of:

testing whether a telephone number that said wireless mobile station is calling is listed in a privileged number directory in said wireless mobile station; and transmitting information concerning the location of said wireless mobile station to the location of said telephone number if said telephone number is in said privileged number directory even if the value of said location privacy flag indicates that information concerning the location of said wireless mobile station is not to be transmitted.

20. A method as set forth in claim 15 together with the step of:

receiving an override code; and enabling the transmission of information concerning the location of said wireless mobile station in response to said override code when the transmission of information concerning the location of said wireless mobile station is disabled.

* * * * *